United States Patent [19]

Naito et al.

[11] Patent Number: 4,751,694
[45] Date of Patent: Jun. 14, 1988

[54] COMPACT OPTICAL DISK PLAYER INCLUDING NON-ORTHOGONAL OPTICAL PATHS

[75] Inventors: Takashi Naito; Yoshitaka Ukita; Keiji Maruta, all of Kanagawa, Japan

[73] Assignee: Sony Corporation, Tokyo, Japan

[21] Appl. No.: 105,980

[22] Filed: Oct. 6, 1987

Related U.S. Application Data

[63] Continuation of Ser. No. 603,370, Apr. 24, 1984, abandoned.

[30] Foreign Application Priority Data

Apr. 26, 1983 [JP] Japan ............................ 58-73389

[51] Int. Cl.⁴ .................. G11B 7/095; G11B 7/135; G11B 21/08; G11B 21/10
[52] U.S. Cl. ............................... 369/32; 369/45; 369/46; 369/111; 369/112
[58] Field of Search ......................... 369/111, 112

[56] References Cited

U.S. PATENT DOCUMENTS

| 1,868,304 | 7/1932 | Cargil | 369/249 |
| 2,935,326 | 5/1960 | Grunwald | 369/249 |
| 3,361,429 | 1/1968 | Santelli | 369/249 |
| 3,418,435 | 12/1968 | Norris | 369/249 |
| 4,037,929 | 7/1977 | Bricot et al. | 369/46 |
| 4,135,207 | 1/1979 | Greve et al. | 369/46 |
| 4,143,402 | 3/1979 | Bricot et al. | 369/46 |
| 4,150,399 | 4/1979 | Boonstra et al. | 369/46 |
| 4,321,701 | 3/1982 | Arquie et al. | 369/45 |
| 4,458,980 | 7/1984 | Ohki et al. | 369/46 |
| 4,475,179 | 10/1984 | Geyer | 369/45 |
| 4,482,988 | 11/1984 | Tsurushima et al. | 369/45 |
| 4,505,584 | 3/1985 | Kato et al. | 369/46 |
| 4,536,865 | 8/1985 | Kenmostu et al. | 369/75.2 |
| 4,545,046 | 10/1985 | Jansen et al. | 369/33 |

FOREIGN PATENT DOCUMENTS 59-30268 2/1984 Japan ............................ 369/219

Primary Examiner—Raymond F. Cardillo
Assistant Examiner—James E. Tomassini
Attorney, Agent, or Firm—Lewis H. Eslinger

[57] ABSTRACT

An optical disk player is provided with a casing or base which need not be substantially larger than a square inscribed by the circular perimeter of the compact disk which it plays by causing the optical pick-up to radially scan the disk along a path at a predetermined angle to the sides of the square, preferably at about 45° thereto. At the outermost position of the pick-up, its object lens is centered at the outermost track on the disk, and a corner of the casing conveniently accommodates the portion of the pick-up which then necessarily extends outwardly beyond the outermost track.

6 Claims, 10 Drawing Sheets

FIG.1 (PRIOR ART)
FIG.2 (PRIOR ART)
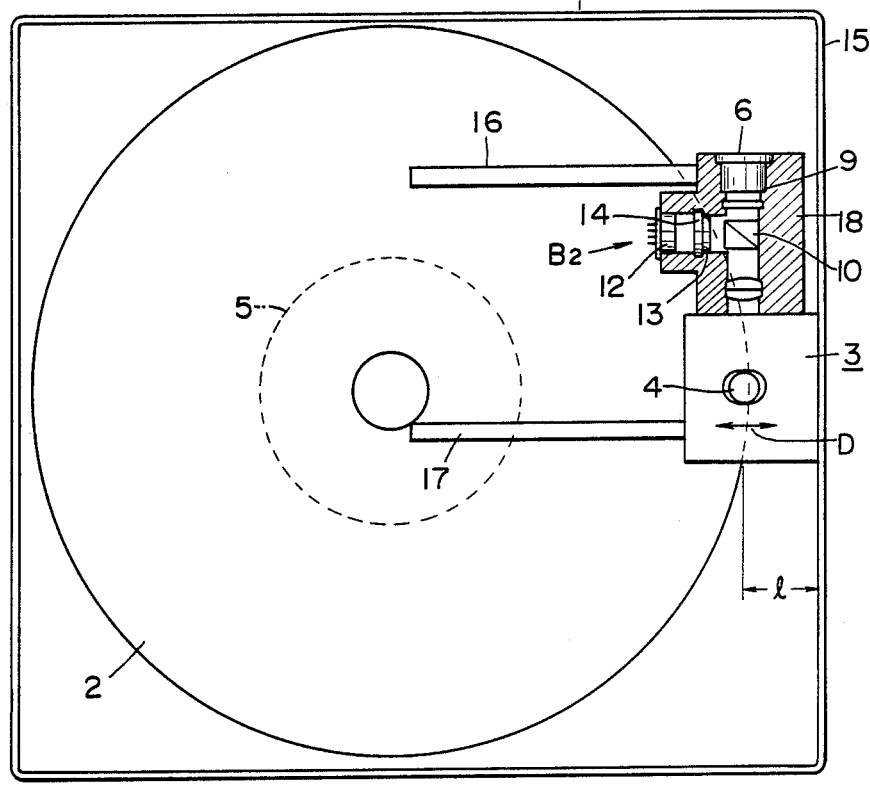
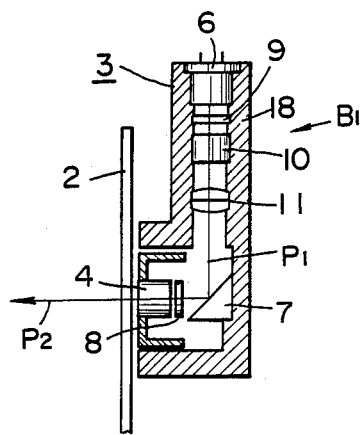

COMPACT OPTICAL DISK PLAYER INCLUDING NON-ORTHOGONAL OPTICAL PATHS

BACKGROUND OF THE INVENTION

1. Field of the Invention

This invention relates to an optical disk player wherein an optical disk on which information signals, such as audio and/or video signals, are recorded is irradiated with a laser beam for reading out and reproducing the information signals.

2. Description of the Prior Art

Optical disk players are becoming more and more popular, partly due to their superior reproduction capacities and partly due to their reduced size as compared to players for other types of disks.

An optical disk player generally has a disk table driven by a spindle motor. An optical disk is inserted into the disk player and affixed to this disk table for rotation therewith. An optical pick-up including a semiconductor laser is adapted to travel in a direction across a series of substantially circular concentric tracks recorded on the disk. The laser beam emitted from the semiconductor laser is directed onto a surface of the optical disk at right angles thereto so as to scan the tracks for reading out and reproducing the information signals recorded in the tracks.

In an optical disk player of the above type, the information signals, such as audio signals, in the form of a number of pulse coded bit strings, are recorded with high density on the optical disk used as the signal recording medium. A standard disk size having a diameter of 12 cm. has been adopted as the "compact disk" for prerecorded musical or audio signals. Since this "compact" optical disk has such a small size and is used as the standard recording medium for the optical disk players designed for playback of prerecorded musical or audio signals, an effort has been made to similarly reduce and standardize the size of the optical disk player itself. For example, in order to minimize the height or thickness of the optical disk player, the optical pick-up may be arranged so that the laser beam is emitted from the laser in a direction parallel with the surface of the optical disk affixed to the disk table and at right angles with the optical axis of an object lens by which the laser beam is eventually focused at the surface of the optical disk. Some of the optical components, such as lenses, ¼ wave plates etc., may be arranged along this direction parallel with the disk surface so that the required thickness or height of the optical disk player is reduced. The laser beam is then reflected 90° by a mirror and transmitted towards the object lens which converges the laser beam and directs it vertically towards the surface of the optical disk. The object lens also receives the laser beam reflected back from the disk surface. Such optical pick-up in which the laser beam is emitted from the semi-conductor laser in a direction normal to the optical axis of the object lens has a lesser thickness than one in which for example, the laser beam is emitted from the laser in a direction aligned with the optical axis of the object lens.

As mentioned above, it is desirable to reduce the size of the base and/or outer casing of optical disk players and the arrangement of the optical pick-up may be conducive to reducing the thickness or height of the overall device. Conventional optical disk players are usually provided with a rectangular casing and the optical pick-up is mounted for movement in a direction normal to a side of the rectangular casing along a radius of the optical disk on the disk table so that the record tracks on the disk are scanned by the laser beam for reproducing the information signals recorded in the tracks.

In this type of conventional disk player, the optical pick-up is provided with a biaxial driving device for the object lens for effecting servo control of the object lens along two mutually perpendicular or orthogonally related axes, that is, in the directions for focusing the laser beam at the plane of the tracks on the optical disk, and for accurately positioning the laser beam in the tracking or radial direction. This biaxial driving device and the mounting for the object lens tend to be bulky. Therefore, when the optical pick-up is transferred to a position for scanning the outermost track on the optical disk, the optical pick-up projects substantially beyond the outer periphery of the optical disk. Thus, the side of the outer casing normal to the direction of travel of the optical pick-up must be spaced substantially outward from the perimeter of the optical disk and it has not been possible to reduce the outer casing to the size of a rectangle inscribed by the circular perimeter of the optical disk, that is, to reduce the optical disk player to the smallest size possible.

OBJECTS AND SUMMARY OF THE INVENTION

It is an object of the present invention to provide an optical disk player having an outer casing reduced to a minimum size.

It is another object of this invention to provide an optical disk player having a square outer casing with dimensions in orthogonally related directions substantially equal to the diameter of an optical disk received within the optical disk player.

In accordance with an aspect of the invention, an optical disk player of the type adapted to play a compact disk having information recorded on its surface in substantially circular concentric tracks comprises a base or casing having dimensions in two orthogonally related directions substantially equivalent to the diameter of the disk and at least one portion projecting beyond the periphery of the disk in a radial direction intermediate the orthogonally related directions, an optical pick-up in said base or casing including an object lens for scanning the tracks, and drive means for moving the optical pick-up along a straight path parallel with said radial direction between an outermost position for scanning an outermost track of said disk and in which said pick-up is accommodated, at least in part within said projecting portion and an inner position for scanning an innermost track of the disk.

The above, and other, objects, features and advantages of the present invention, will become readily apparent from the following detailed description of illustrative embodiments of the invention which is to be read in connection with the accompanying drawings.

BRIEF DESCRIPTION OF THE DRAWINGS

FIG. 1 is a top plan view of an optical disk player according to the prior art.

FIG. 2 is a schematic cross-sectional view showing an optical pick-up unit employed in the disk player of FIG. 1.

DETAILED DESCRIPTION OF PREFERRED EMBODIMENTS

Figure 3:
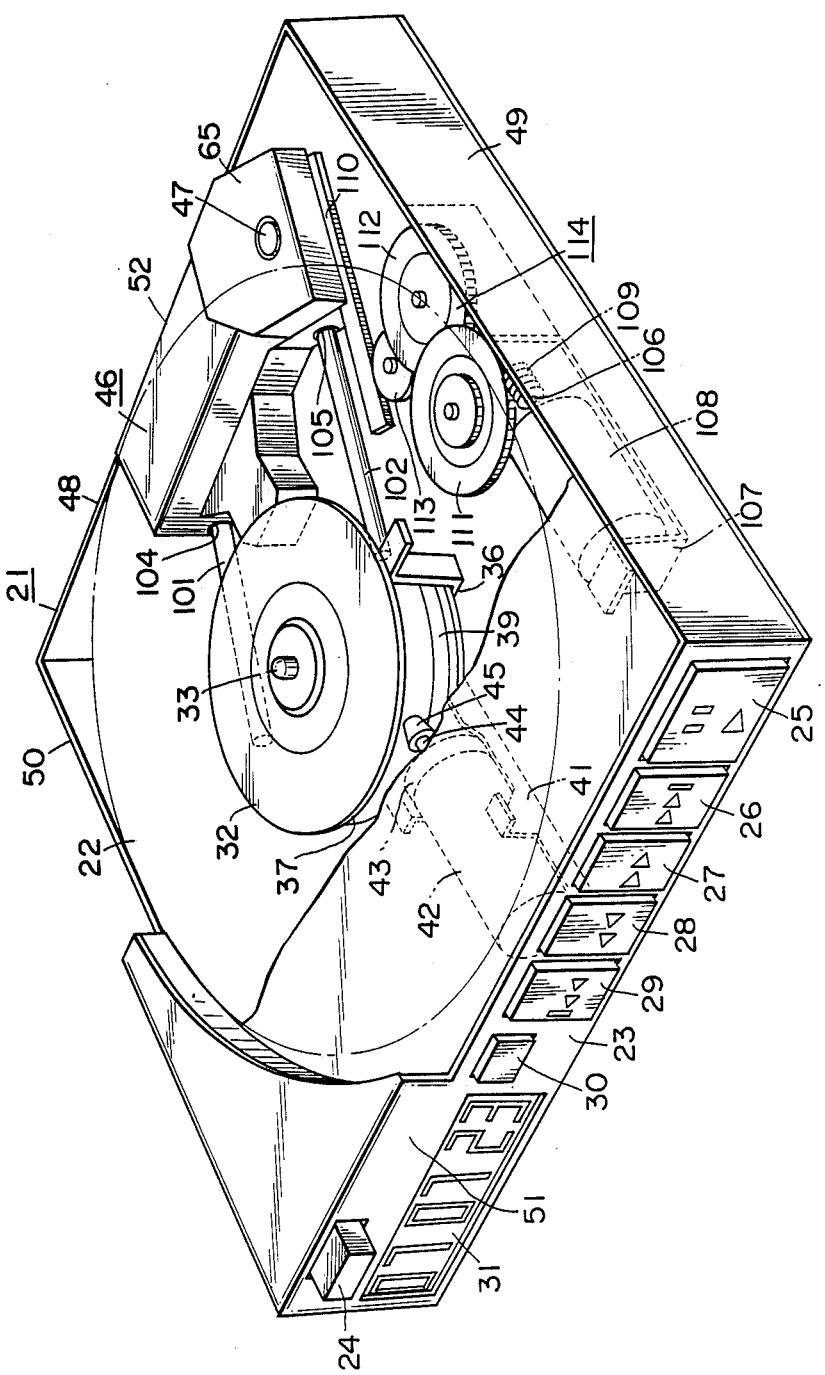
FIG. 3 is a perspective view of an optical disk player according to a preferred embodiment of the present invention.

In the present specification, the term "scanning" is used to designate linear movements of the optical pick-up for moving the focused laser beam radially across the disk surface between the inner and outer peripheries of the disk.

The term "fine tracking" is used to designate small movements of the object lens generally in the direction across the record tracks to cause the focused laser beam to follow a track on the disk during rotation of the latter.

The terms "tracking control" and "tracking servo control" are used to designate the control operation for fine tracking defined above.

Referring now to the drawings in detail, and initially to FIGS. 1 and 2 thereof, an optical disk player as previously proposed is shown to have a rectangular outer casing 1 substantially inscribed, at three sides, by the outer circumference of an optical disk 2. An optical pick-up 3 is constructed as shown in FIG. 2 to allow the thickness or height of the optical disk player to be reduced. More particularly, in optical pick-up 3, a laser beam is caused to travel along an optical path having a portion $P_1$ parallel with the surface of the optical disk 2 mounted on a disk table 5 (FIG. 1), and the laser beam is then reflected 90° by a mirror 7 and transmitted through an object lens 4 in an optical path portion $P_2$ which is normal to the disk 2 and parallel with the optical axis of the object lens 4 provided for focusing the laser beam at the surface of the optical disk 2 and to receive the laser beam reflected back from the surface. Thus, in the optical pick-up 3, a semiconductor laser 6 is mounted at the end of a housing 18 to emit the laser beam in the direction of path portion $P_1$ which is at right angles to the optical axis of the object lens 4. An optical block $B_1$, including a diffraction grating 9, a beam splitter 10 and a collimating lens 11, is mounted within housing 18 with its optical axis is parallel to optical path portion $P_1$ of the laser beam and normal to the optical path portion $P_2$ through object lens 4. In the optical block $B_1$, collimating lens 11 forms the laser beam into a parallel beam and the laser beam is conventionally divided by diffraction grating 9 into a main beam adapted for reading out the recorded signals and a pair of auxiliary beams used for performing tracking servo control, as will be described later.

Another optical block $B_2$, illustrated in FIG. 1, is provided within housing 18 and is utilized for tracking control. The optical block $B_2$ has its optical axis perpendicular to the plane containing optical path portions $P_1$ and $P_2$. The laser beam reflected from optical disk 2 passes back through object lens 4, is again reflected 90° by mirror 7 and then reflected through 90° by beam splitter 10 in the direction toward a photodetector 12 in second optical block $B_2$. The block $B_2$ further includes an intermediate lens 13 and a cylindrical lens 14 and placed between beam splitter 10 and photodetector 12 along the reflected laser beam path. The optical pick-up 3 having the above arrangement, in which the laser beam path is right agnularly bent between the semiconductor laser 6 and on object lens 4, is smaller in the direction normal to the disck 2 than one in which the laser beam is directed along a straight path from the laser through object lens 4. In the latter case, the housing of the optical pick-up would have to be large enough to accomodate the laser 6, diffraction grating 9, beam splitter 10, collimating lens 11 and object lens 4 all in a straight line in the direction of the height of the optical disk player. In the so-called thin type optical pick-up, only mirror 7 and object lens 4 need be accommodated in this direction. Thus the optical disk player with the thin type optical pick-up 3 may have a reduced thickness or height.

As mentioned above, it is desirable to reduce the size of the outer casing 1 and thin type of the optical pick-up 3 makes it possible to minimize the thickness or height of the outercasing 1. However, the conventional optical disk player shown in FIG. 1 is constructed so that optical pick-up 3 is mounted for movement in a direction indicated by the arrow D which is normal to a side wall 15 of the rectangular casing 1. The tracks on optical disk 2 affixed to disk table 5 are scanned along a radius of the disk by the laser beam transmitted through the object lens 4 as the optical pick-up 3 moves in the direction of arrow D from the inner periphery towards the outer periphery of optical disk 2 for reproducing the recorded information signal. To this end, optical pick-up 3 is movably mounted on a pair of guide shafts 16, 17 which are fixed in perpendicular relation to side wall 15 of the outer casing 1. Thus, the optical pick-up 3 may be moved in respect to the disk 2 by any suitable transfer means, such as, a driving motor (not illustrated), with the optical axis of the object lens 4 always tracing a radius of optical disk 2 placed on disk table 5.

Optical pick-up 3 may be provided with a conventional biaxial driving device for the object lens 4 for effecting servo control of the object lens 4 along two mutually perpendicular axes, that is, in the directions for tracking control and focusing, respectively. Such biaxial driving device tends to be bulky. Therefore, when the optical pick-up 3 is at an outer position for reading out the outermost track on optical disk 2, as on FIG. 1, that is, when the optical axis of object lens 4 is coincident with the outermost track, optical pick-up 3 projects beyond the outer periphery of optical disk 2 at least a distance l (FIG. 1), as measured from the center of the lens 4 to the outer side of housing 18. Even if tne biaxial driving device could be reduced in size so that its diameter is approximately equal to that of object lens 4, object lens 4 must still be at least 5 to 6 mm in diameter, in order to provide a beam spot of sufficient diameter on the surface of optical disk 2 and to provide an appropriate focal length of object lens 4. Thus, when optical pick-up unit 3 is at this outer position for reading out the outermost track on optical disk 2, one side of housing 18 carrying object lens 4, inclusive of object lens 4, projects beyond the circumference of optical disk 2. Therefore, the side wall of outer casing 1 perpendicular to tne scanning direction D of optical pick-up 3 must project at least the distance l beyond the circumference of optical disk 2. From the foregoing, it will be seen that it is not possible with this construction according to the prior art to reduce the outer casing 1 to the side of a square inscribed, at all sides, by the circular perimeter of the optical disk 2, this is, to reduce orthogonally related dimensions of optical disk player to the minimum.

A preferred embodiment of an optical disk player according to the present invention will now be initially described with reference to FIGS. 3 and 4. Such optical disk player is shown to have an outer casing 21 constituting the body or base of the player proper and having the shape of a square inscribed by the circular perimeter of an optical disk 22 to be played by the player. Thus, each of the fours sides 48, 49, 50 and 51 of casing 21 is approximately equal in length to the diameter R of optical disk 22. Various operating buttons, such as a power switch button 24, a play/pause button 25, a tune select button 26, a rapid feed button 27, a designated tune select button 28, a reverse button 29 and an eject button 30, as well as a timer or tune address display 31, are provided on a front panel 23 at the side 51 of square outer casing 21.

Figure 6:
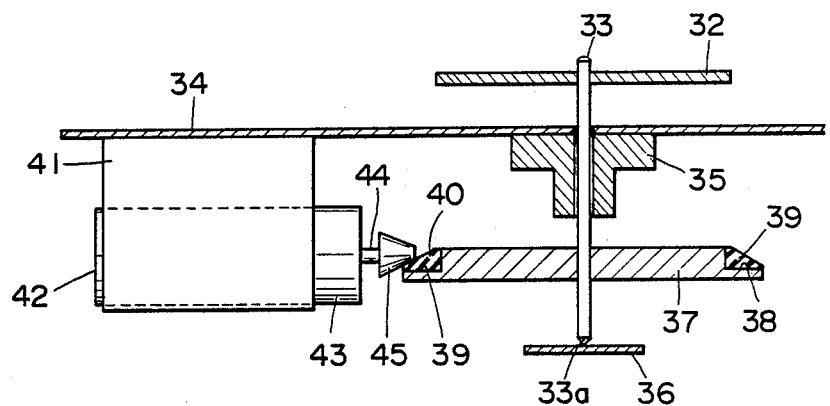
FIG. 6 is a side cross-sectional view showing a driving system for a disk table of the optical disk player of FIG. 3.

Located centrally within outer casing 21 is a rotatable spindle 33 which is made fast to a disk table 32 to which optical disk 22 is to be affixed its axis approximately coincident with the center of outer casing 21. A chassis 34 (FIG. 6) of the disk player has a bearing 35 attached at the underside thereof, and spindle 33 passes through and is supported by bearing 35. Spindle 33 is also supported at a tapered lower end 33a thereof by a thrust bearing 36 suitably suspended from the underside of chassis plate 34. A metallic drive wheel 37 is secured to a lower part of spindle 33 and has an annular groove 38, formed as a step, at the outer peripheral surface of wheel 37. Groove 38 receives an elastic ring 39, which may be made of rubber, and has a tapered upper surface 40. Motor supporting brackets 41 are mounted at the underside of chassis plate 34 and support an electric motor 42 for driving table 32. Drive motor 42 has its shaft (not illustrated) connected via a reduction gear unit 43 to a driving shaft 44. Driving shaft 44 in turn carries a tapered drive roll 45 which presses against tapered surface 40.

In this manner, a table driving system is provided in which drive roll 45, driven by drive motor 42 and pressed against upper surface 40 of wheel 37, rotates the latter and therefore causes spindle 33 and disk table 32 to rotate. Drive motor 42 may be mounted, as shown with its output shaft parallel to the surface of the optical disk 22 on disk table 32. Consequently the spindle driving system may be reduced in size, contributing further to the reduction in height of the optical disk player.

In the interior of outer casing 21, in which disk table 32 is mounted in the above described manner, there is also mounted an optical pick-up 46 (FIGS. 3, 4 and 5) having an object lens 47 in opposing relation to the surface of disk 22. Optical pick-up 46 is adapted to provide a laser beam for irradiating the surface of optical disk 22 affixed to disk table 32 and thereby reading out the information signals, such as musical sound signals, recorded on the optical disk 22. The optical pick-up 46 is adapted to travel in a direction D' on FIG. 4 which is parallel with a radius of optical disk 22 and which is at an acute angle in respect to each of the side walls 48–51 of casing 21.

Figure 7A:
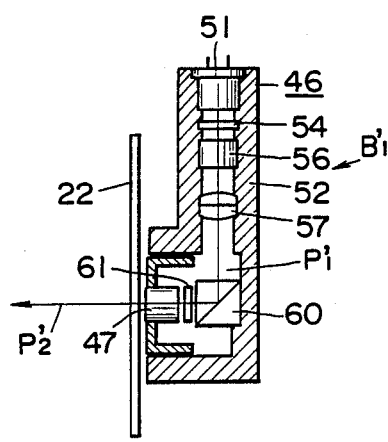
FIG. 7(A) is a cross-sectional view of an optical pick-up employed in the disk player of FIG. 5 and which is taken along the line A—A thereon.
Figure 7B:
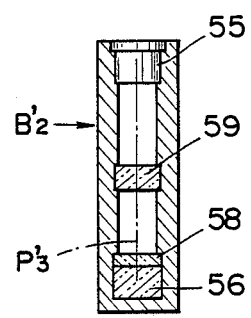
FIG. 7(B) is a cross-sectional view of the optical pick-up of FIG. 5, is taken along the line B—B thereof.

It should be noted in FIG. 7A that the optical pick up 46 employed in the optical disk player according to the present invention is similar to the previously described pick-up 3 in that the laser beam is directed along a bent path in order to reduce the thickness of the optical pick-up 46 in the direction perpendicular to disk 22. To this end, optical pick-up 43 has a semiconductor laser 51 (FIG. 7A) mounted at an end of a housing 52 so that the laser beam emanating therefrom is directed along an optical path portion $P'_1$ normal to the path portion $P'_2$ which coincides with the optical axis of the object lens 47. An optical block $B'_1$ including a diffraction grating 54, a beam splitter 56 and a collimating lens 57, is provided within housing 52 along the optical path $P'_1$. Diffraction grating 54 is conventionally used to divide the laser beam into a main beam for reading the recorded signals and a pair of auxiliary beams for tracking servo centrol purposes to be discussed in detail later. Beam splitter 56, is used to direct the laser beam reflected from the optical disk 22 towards a photodetector 55 (FIG. 7B), while collimating lens 57 is used to collimate the lazer beam, all as in pick-up 3 of the conventional optical disk player described above.

A separate optical block $B'_2$ including an intermediate lens 58 and a semicylindrical lens 59 is also provided within housing 52 and has its optical axis or path portion $P'_2$ (FIGS. 4 and 7B) normal to a plane which contains both the optical path portions $P'_1$ and $P'_3$ on FIG. 7A. Intermediate lens 58 directs the return laser beam to photodetector 55 after it has been refracted by 90° or reflected through beam splitter 56. Semicylindrical lens 59 is used for astigmatizing the laser beam, as in the prior art optical pick-up 3.

The laser beam emanating from semiconductor laser 51 is reflected by a reflecting mirror 60 through an angle of 90° between optical path portions $P'_1$ and $P'_2$ and then passes through a ¼ wave plate 61, which rotates the beam axis by 45°, before reaching object lens 47.

Figure 8:
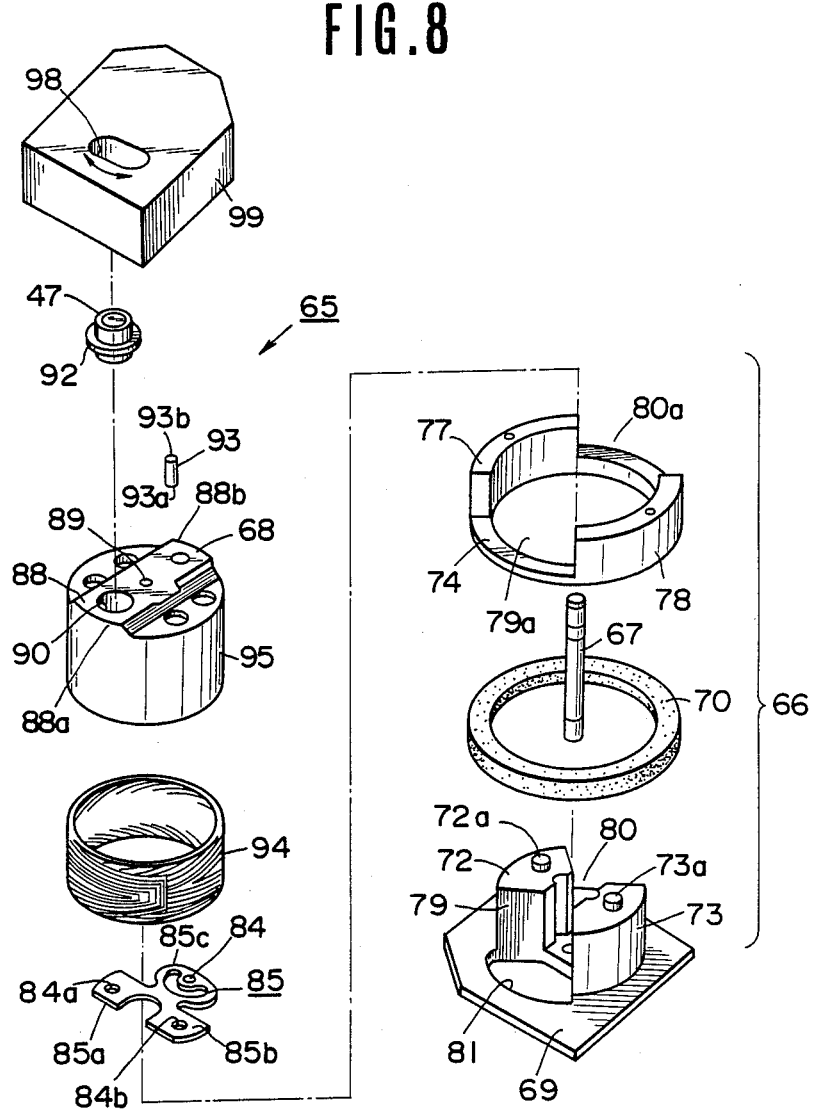
FIG. 8 is an exploded perspective view showing a biaxial driving device that may be employed within the optical pick-up of FIG. 5.

Object lens 47, which converges the laser beam from the semiconductor laser 51 for irradiation of the surface of optical disk 22 and which receives the reflected laser beam back from the disk surface, is mounted in a biaxial driving device 65 incorporated in housing 52. Biaxial driving device 65 operates to drive the lens 47 in two mutually perpendicular directions, that is, in the focusing direction and the tracking direction, for simultaneously performing a focusing control operation and a tracking control operation for causing the laser beam to accurately trace the tracks. As shown in FIG. 8, the biaxial driving device 65 comprises a stationary section 66, which forms a magnetic circuit providing a magnetic gap and includes a supporting shaft 67, and a movable section 68 mounted on shaft 67 of the stationary section 66 for rotation about and sliding along shaft 67. The stationary section 66 includes, in addition to shaft 67, a mounting base plate 69 for securing stationary section 66 to housing 52, a ring magnet 70, two diametrically opposed sector-shaped inner yokes 72, 73 integrally mounted on the base plate 69, and two diametrically opposed sector-shaped outer yokes 77, 78 integrally mounted on a ring-like yoke mounting rim 74 so as to face inner yokes 72, 73, respectively. Supporting shaft 67 is mounted vertically at the center of base plate 69, and two cut-outs 79,80 are defined between and at opposite sides of inner yokes 72,73 which have lugs 72a, 73a on their respective upper end faces. Base plate 69, has a window 81 coincident with cut-out 79 for passing the laser beam to and from object lens 47 along optical path portion P'$_2$ in housing 52. Ring magnet 70 is mounted on base plate 69 around the base portions of inner yokes 72, 73, and yoke mounting rim 74 formed with outer yokes 77,78 rests securely on ring magnet 70. Outer yokes 77,78 extend over arcuate lengths equal to one-fourth the circumferential length of the rim 74 and as earlier mentioned, are diametrically opposite to each other. Thus two cut-outs 79a, 80a are formed between the opposed sides of outer yokes 77,78.

Figure 10:
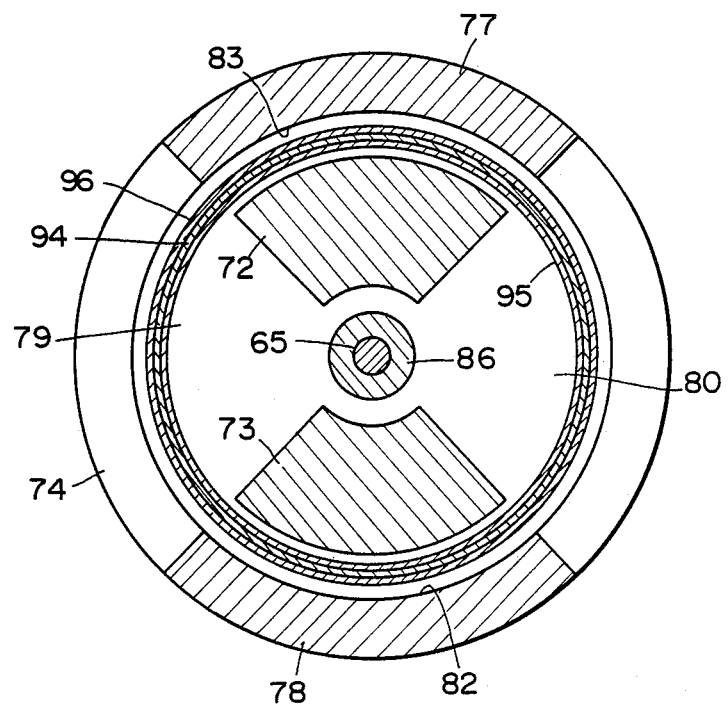
FIG. 10 is a cross-sectional view of the driving device taken along the line A—A in FIG. 9.

Outer yokes 77,78 are located in opposition or facing relation to inner yokes 72, 73, as shown in FIG. 10, to form magnetic gaps 82,83 therebetween and define a magnetic circuit. A damper 85 (FIG. 8) of resilient material is provided with a central flexible portion 85c having a center aperture 84 and lateral legs 85a, 85b provided with apertures 84a, 84b respectively. Damper holder 85 is mounted, at its legs 85a, 85b, on yokes 72,73 with lugs 72a, 73a being matingly received in apertures 84a, 84b. Portions 85c of damper holder 85 faces the center of cut-out 80 defined between inner yokes 72,73, at the side opposite to cut-out 79 associated with window 81.

Figure 9:
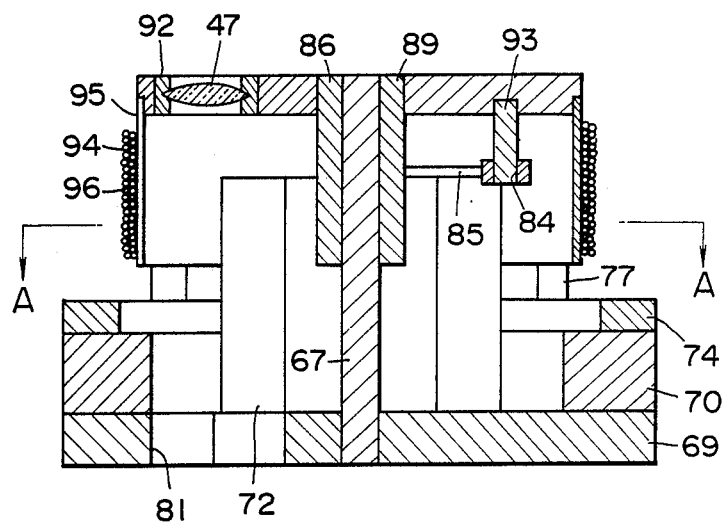
FIG. 9 is an axial sectional view of the driving device of FIG. 8.

A sleeve bearing 86 (FIGS. 9 and 10) of movable section 68 is slidably mounted on supporting shaft 67. Movable section 68 is in the form of a disk slightly larger than the outer periphery of the inner yokes 72, 73, with an integral diametrically directed raised portion 88 having a central vertical hole 89 into which is inserted and secured the upper end part of bearing 86. One end 88a of raised portion 88 of the movable section 68 has a vertical lens hole 90 into which is inserted and secured a lens frame 92 supporting object lens 47. Thus, window 81 is registered with object lens 47 so that the laser beam in optical path portion P'$_2$ (FIG. 7A) can pass through light window 81 and cut-out 79 defined between inner yokes 72,73.

Mounted at the other end 88b of raised portion 88 of movable section 68 is a supporting pin 93 having an upper end 93b secured to underside of movable section 68 and a lower end 93a secured in aperture 84 of damper 85 so that the latter damps movements of section 68 relative to stationary section 66.

Movable section 68, constructed in the above described manner, is further provided with a tracking drive coil 94 on a tubular bobbin 95. Such tracking drive coil 94 has a skew winding pattern adapted to drive movable section 68 angularly about the axis of shaft 67. Due to the radial spacing of object lens 47 from the axis of shaft 67, angular movement of section 68 about shaft 67 causes movement of object lens 47 radially in respect to disk 22. This radial motion provides tracking control of object lens 47 in the direction transverse or across the tracks on optical disk 22. On tracking drive coil 94 is further mounted a focus control coil 96 having a normal winding pattern and adapted for causing movable section 68 to move axially on shaft 67, that is, in the vertical direction of FIG. 8 for adjusting object lens 47 in its focal direction relative to the disk 22. The biaxial driving device 65 is covered by a cap 99 having an elongated through-hole 98 opposing the object lens 47 so as to avoid interference with the laser beam.

For achieving focusing control by means of the adjustment of object lens 47 by biaxial driving device 65, the laser beam reflected back from the surface of optical disk 22 is astigmatized by semicylindrical lens 59 and passes to photodetector 55. Photodetector 55 may conventionally be divided into four detector elements. Focusing servo currents corresponding to differential outputs from respective sensors associated with the four detector elements are conventionally derived and supplied to focus control coil 96 (FIG. 10) for driving movable section 68 to which the object lens 47 is attached, as described above.

Figure 11:
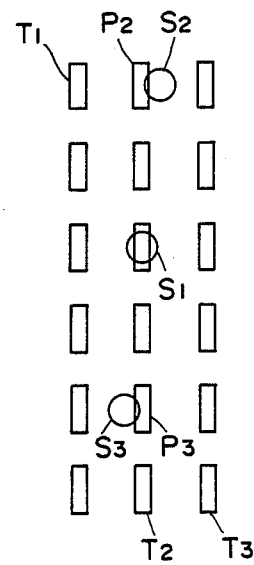
FIG. 11 is an enlarged diagrammatic plan view of a portion of an optical disk, illustrating tracking error detection in a three spot system.

Tracking control of object lens 47 is conventionally performed as follows: As earlier mentioned, the laser beam emanating from semiconductor laser 51 is divided by diffraction grating 54 into a main beam for reading the signals recorded in the tracks and two auxiliary beams. As shown on FIG. 11, the main beam forms a main beam spot $S_1$ on the surface of optical disk 22, as shown in FIG. 11, and the two auxiliary beams form auxiliary beam spots $S_2$, $S_3$ which are spaced oppositely from main beam spot $S_1$ in a direction substantially tangential to a record track being scanned by main beam spot $S_1$. Further, with main beam spot $S_1$ accurately positioned or centered on a track, for example, the track $T_2$ on FIG. 11, the auxiliary beam spots $S_2$ and $S_3$ have small, opposed deviations in respect to the track $T_2$. The amounts of the auxiliary beams reflected from pits $P_2$, $P_3$ of track $T_2$ on which the auxiliary beam spots $S_2$, $S_3$ are incident are detected by photodetector 55, and tracking servo currents are derived corresponding to differential outputs obtained from the reflected auxiliary beams. These tracking servo currents are supplied to tracking driving coil 94 for angularly driving movable section 68, and the object lens 47 attached thereto, about shaft 67 until main beam spot $S_1$ is positioned accurately on track $T_2$. In this manner, the tracking servo control enables the optical pick-up 46 to trace accurately.

The optical pick-up 46, with the biaxial drive 65 supporting the biaxially movable object lens 47, may be quite bulky, as described above in connection with the prior art optical disk player. However, in this embodiment of the optical disk player of the present invention, wherein optical pick-up 46 travels at an acute angle with respect to the side walls 48-51 of the square outer casing 21, when the optical pick-up unit 46 is moved to an outer position for scanning the outermost track of the optical disk 22, as shown on FIG. 4, it is positioned within the corner C defined by the side walls 48 and 49. As a result, while optical pick-up 46 still projects beyond the outer circumference of optical disk 22, it fits within the corner C so that neither the side wall 48 nor the side wall 49 needs to extend beyond the perimeter of the optical disk 22. Therefore, if the casing 21 of the optical disk player embodying this invention is rectangular, each of its four side walls may have a length substantially equal to the diameter of the optical disk 22. In that case, the outer casing 21 has its four side walls 48–51 forming the smallest possible square, that is, inscribing the circular perimeter of record disk 22.

Figure 4:
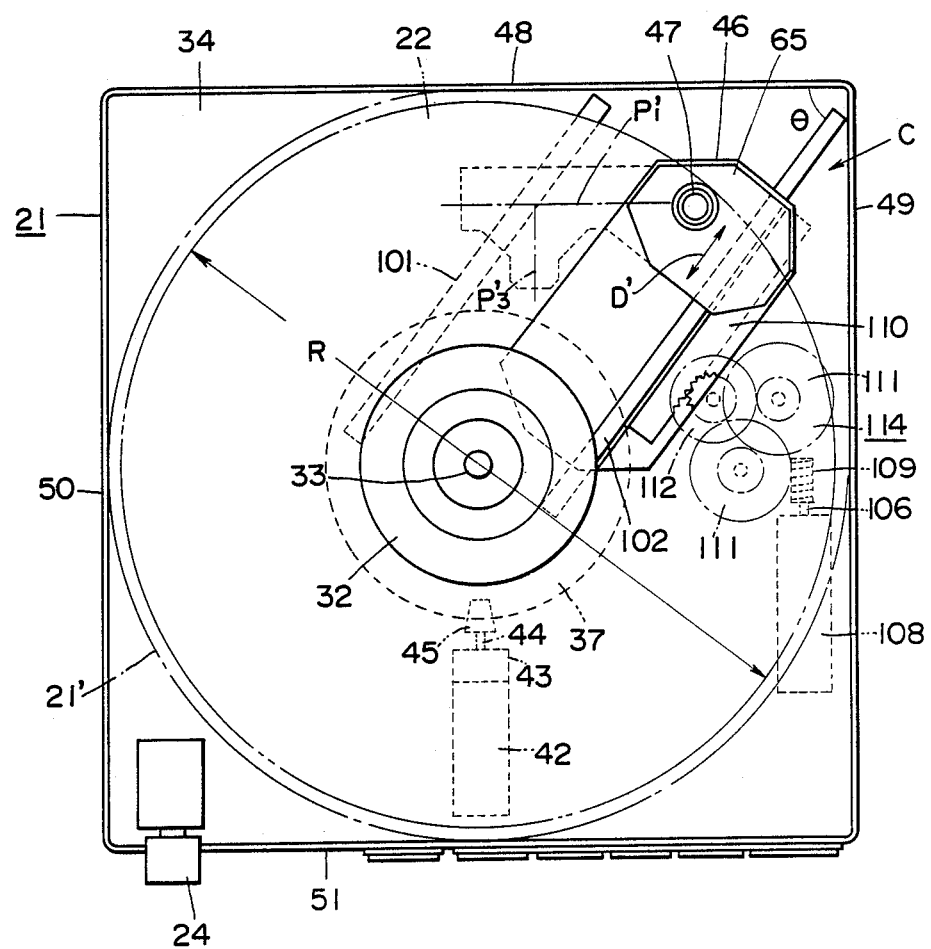
FIG. 4 is a top plan view of the optical disk player of FIG. 3.

It is within the scope of the present invention to reduce the size of the outer casing 21 still further, for example by retaining the corner C and conforming the remainder of the perimeter of the outer casing 21 to a curve lying substantially along the outer circumference of optical disk 22, for example, as indicated in dot-dash lines at 21' on FIG. 4. In addition, the shape of corner C may be varied from the sharply angled configuration shown, provided that it allows sufficient clearance for optical pick-up 46. These and similar variations will be readily apparent to those skilled in the art.

In the preferred embodiment of the present invention, wherein the casing 21 is square, the optical pick-up 46 is mounted for movement in the tracking direction D' (FIG. 4) with the optical path portion P'$_1$ (FIGS. 4 and 7A) extending between the beam splitter 56 and mirror 60 maintained substantially parallel to the rear side wall 48. In other words, optical pick-up 46 is arranged in outer casing 21 so that the laser beam is emitted from semiconductor laser 51 in a direction parallel to the surface of the optical disk 22 and also parallel to the surface of rear side wall 48.

It should be noted that tracking motion of the laser beam across the tracks of optical disk 22 is performed in a direction normal to each track at the location where the latter is impinged upon by main beam spot S$_1$. To this end, optical pick-up 46 is mounted within outer casing 21 such that object lens 47 is moved along a radius of optical disk 22, that is, in the direction normal to the tracks. More particularly, optical pick-up 46 is shown mounted on two parallel guide rods 101,102 by slide bearings 104,105 disposed within housing 52. These guide heads 101,102 are mounted on chassis base plate 34 in parallel with the radial direction in which the object lens 47 to be moved for scanning, that is, in the tracking direction. In the present embodiment, the guide rods 101, 102 are mounted on chassis base plate 34 at an angle $\theta$ (FIG. 4) approximately equal to 45° with respect to the rear side wall 48. It will be appreciated that the radial direction of movement of pick-up 46 is intermediate the orthogonally related directions which are perpendicular to side walls 48 and 49 and in which the dimensions of casing 21 are substantially equivalent to the diameter R of disk 22. Pick-up 46 is disposed, in its outer position illustrated in FIG. 3, within corner C of the square casing 21, and the laser beam emitting from semiconductor laser 51 is directed along optical path portion P'$_1$ towards object lens 47 in a direction parallel to the rear side wall 48. Additionally, optical pick-up 46 is guided so that, in its movements along rods 101,102, object lens 47 is moved radially across optical disk 22.

Figure 5:
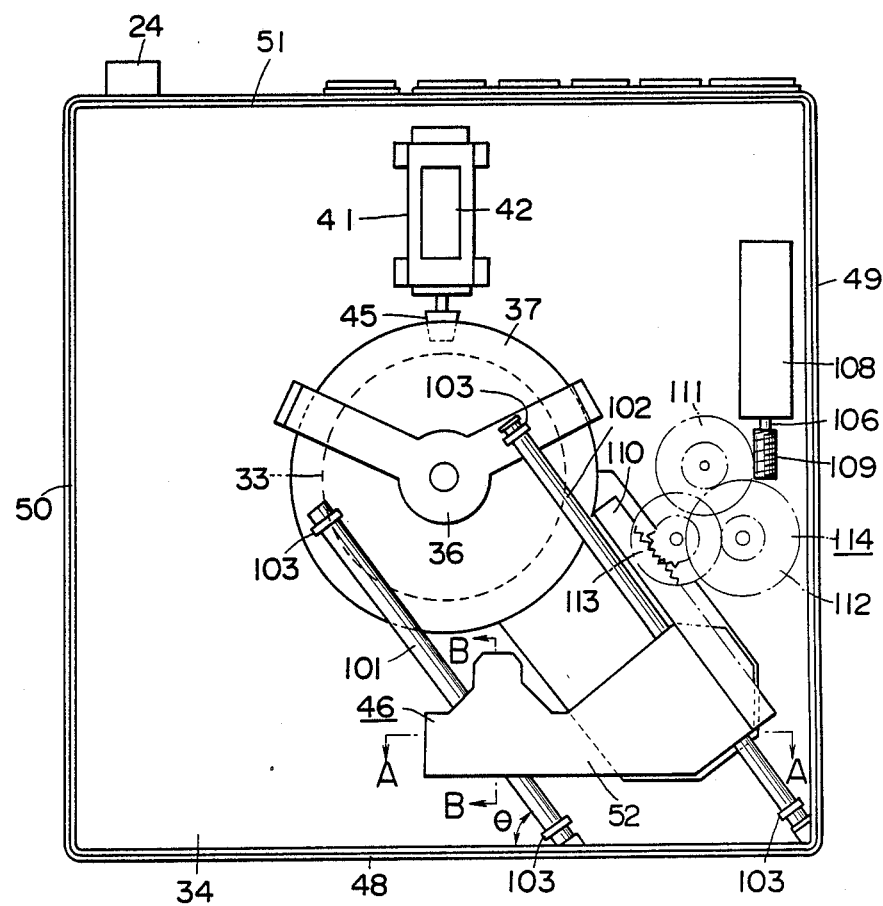
FIG. 5 is a bottom plan view of the optical disk player of FIG. 3.

Guide rods 101, 102 are inserted at thin ends, in suitable apertures in mounting tabs 103 struck downwardly from chassis base plate 34 (FIG. 5). Guide rod 101 is fixedly positioned for accurately setting the direction of movement of optical pick-up 46, while guide rod 102 may be adjustably mounted for allowing compensation for any mounting error relative to the guide rod 101 and the machining tolerance of the bearing of optical pick-up 46.

Optical pick-up 46 may be driven to scan optical disk 22 by a pick-up driving electric motor 108 mounted by a motor supporting bracket 107 at the underside of chassis base plate 34 adjacent side wall 49 with an output shaft 106 of the motor parallel to side wall 49,50 of casing 21. Motor 108 and optical pick-up 46 are interconnected by a reduction gearing 114 shown in FIGS. 3–5 to include meshing first, second and third gears 111,112 and 113 for transmitting motion from a worm gear 109 on output shaft 106 to a rack 110 secured to housing 52 in parallel with guide rods 101,102.

As has been noted, tracking servo or control movements of the object lens 47 should be effected in the scanning direction which is perpendicular to the track being scanned, that is, in the radial direction of disk 22, in order that the tracks may be accurately scanned by the main beam.

In the embodiment of the present invention under discussion, tracking control movement of the object lens 47 is generally effected in a direction at an angle of approximately 45° with respect to the optical path portion P'$_1$ of optical block B'$_1$ including diffraction grating 54, beam splitter 56 and collimating lens 57. Since optical path portion P'$_1$ of optical block B'$_1$ is parallel to rear side wall 48, and the angle of 45° between that optical path portion and the direction of tracking control movement is the same as the angle $\theta$ between guide rods 101,102 and rear side wall 48, tracking control movement occurs in the scanning direction, as required.

In addition, when an optical pick-up 46 utilizes the three-spot tracking control system, discussed above, with reference to FIG. 11, tracking control movements of object lens 47 are performed in accordance with differential outputs generated from auxiliary beam spots S$_2$, S$_3$ spaced in the tangential direction of the track T$_2$ from main beam spot S$_1$. It is therefore required that the three beam spots S$_1$, S$_2$, S$_3$ be spaced apart in a direction perpendicular to the direction of the tracking control movement of object lens 47.

Figure 12:
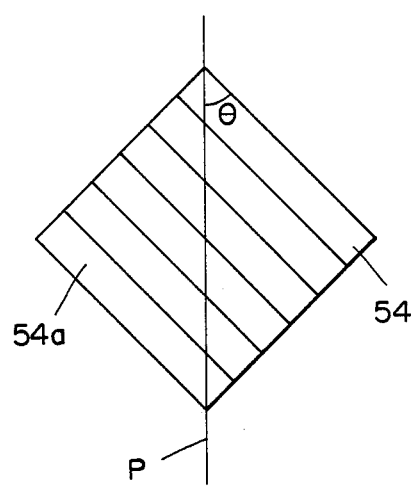
FIG. 12 is a schematic view showing the positioning of a diffraction grating of the optical pick-up according to the present invention.

Thus, in optical pick-up 46, in which the direction of tracking control movement of object lens 47 is at the angle $\theta$ with respect to the optical path portion P'$_1$ of optical block B'$_1$, diffraction grating 54, which divides the laser beam into the three beams, has a grating pattern 54a (FIG. 12) inclined by the same angle $\theta$ in respect to a plane P which contains the optical path portions P'$_1$ and P'$_2$ in optical pick-up 46. Cylindrical lens 59 adapted for astigmatizing the main and auxiliary laser beams reflected back from the surface of optical disk 22 and photodetector 55 receiving the beams from cylindrical lens 59 for detecting the output signals are similarly inclined about optical path portion P'$_3$ by the same angle $\theta$ in respect to a plane which contains optical path portions P'$_1$ and P'$_3$.

In addition, since it is the direction of the light emitting area of semiconductor laser 51 that governs the direction in which the generated laser beam is diffused, semiconductor laser 51 is mounted within housing 52 so that the direction of the light emitting area thereof is inclined similarly to the pattern of diffraction grating 54.

Figure 13:
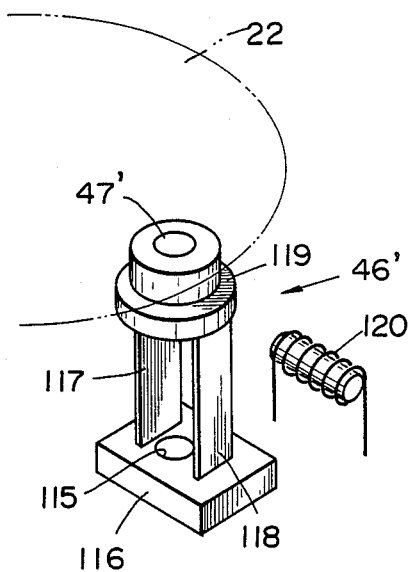
FIG. 13 is a schematic perspective view showing a push-pull type object lens driving system which may be utilized in an optical pick-up according to the present invention.

In the above described optical pick-up 46, the laser beam is divided into three beams by diffraction grating 54 and tracking control of object lens 47 is performed in accordance with differential outputs derived from the two auxiliary beam spots S$_2$, S$_3$. However, an optical disk player according to this invention may have an optical pick-up 46' (FIG. 13) of the known push-pull type, in which case the laser beam reflected back from the track on the disk 22 is detected by a photodetector divided into two photodetector elements and the differential outputs derived from these two elements are utilized for tracking control of object lens 47'. Object lens 47' must still be mounted so that tracking control is performed in the direction normal to or across the record tracks. Only a portion of a push-pull type pick-up is shown schematically in FIG. 13, wherein a base plate 116 having a through-hole 115 for passage of the laser beam is provided with a pair of parallel spring plates 117,118 mounted upright on base plate 116 in planes parallel to tangents to the tracks. Object lens 47' is mounted on a magnet 119 secured to the upper ends of the spring plates 117, 118. To one side of the magnet 119 is mounted a driving coil 120 fed by a driving current corresponding to the differential outputs from the photodetector and producing a corresponding magnetic field. The magnet 119 is displaced transversely as a function of the strength of the magnetic field, displacing spring plates 117, 118, and effecting tracking control of object lens 47 in the direction normal to, or transverse of the tracks. In the case of the optical pick-up partially shown on FIG. 13, in order that outputs from the phototdetector (not shown) may be accurately generated, both the direction in which the photodetector is divided into photodetector elements and the direction in which a cylindrical lens similar to lens 59 is mounted are inclined similarly to the corresponding elements in the earlier described pick-up 46.

In the above described embodiments of an optical disk player in which optical pick-up 46 or 46' is moved radially in a direction at an acute angle with respect to the rear side wall 48 of the square outer casing 21, accurate tracking control may be achieved at any radial position from the inner periphery to the outer periphery of optical disk 22 by performing tracking control movement of object lens 47 in a direction at the same angle θ relative to the optical path portion P'₁ between the beam splitter 56 and the reflective mirror 61. Thus tracking control movements are also effected along a radial line towards and away from the center of the optical disk 22.

In the above described embodiments, optical pick-up 46 or 46' has been described as being moved in a direction D' at an angle θ of approximately 45° with respect to the rear side wall 48 of the outer casing 21. However, the angle θ may be varied suitably, provided that the portion of the biaxial driving device 65 projecting beyond the outer periphery of optical disk 22 when the optical axis of the lens 47 reaches the outermost recording track on the disk 22 is disposed within the corner C projecting beyond the disk and defined by the side walls 48 and 49. Preferably, the angle θ should be as small as practicable in order to conserve space for mounting electrical circuits or mechanical parts within the outer casing 21.

In a variation of the embodiment of the optical disk player described above, and which is illustrated in FIG. 15, a cover lid 127 is pivotably mounted on the outer casing 126 for covering the upper side of the disk table after an optical record disk has been placed thereon. When lid 127 is closed, a disk on the rotary table may be clamped in position inside the disk player between the driven disk table 32 and a chuck (not illustrated) provided on the underside of the lid.

Figure 14:
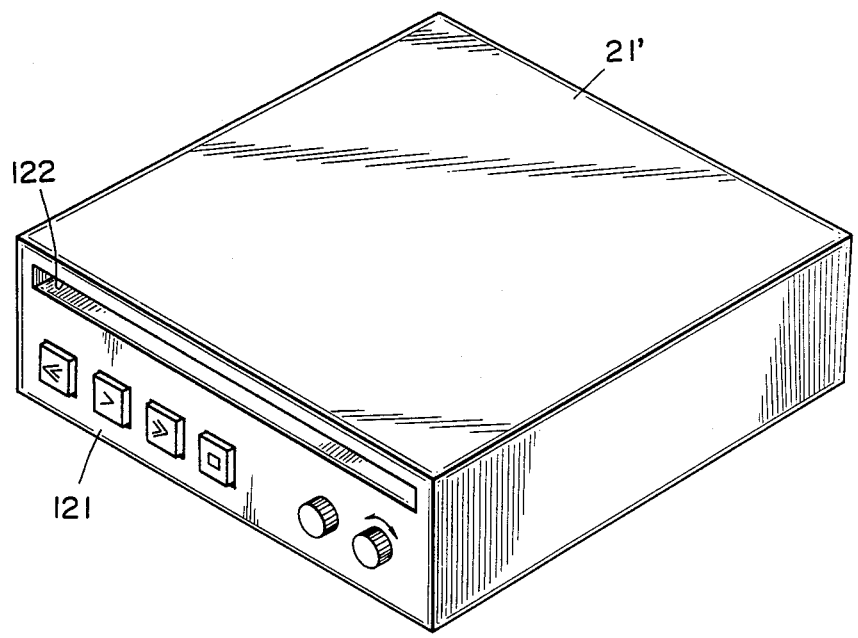
FIG. 14 is a perspective view showing another embodiment of an optical disk player according to the present invention.

However, the present invention is not limited in its application to sich arrangement. Thus, in another embodiment shown in FIG. 14, the optical disk player may be provided with an outer casing 21' which is permanently closed at the top, and wherein an optical disk 22 is inserted into casing 21' through a disk insertion opening or slot 122 in the front exterior wall 121 and loaded onto the disk table by a loading means (not shown) provided within casing 21'. This last embodiment allows further reduction in the size of the optical disk player and is particularly suited for mounting in a dashboard or the like, as in an automotive stereo system. Of course, the embodiments shown broadly on FIGS. 14 and 15 are otherwise similar to the embodiment described in detail with reference to FIGS. 3–12.

Figure 15:
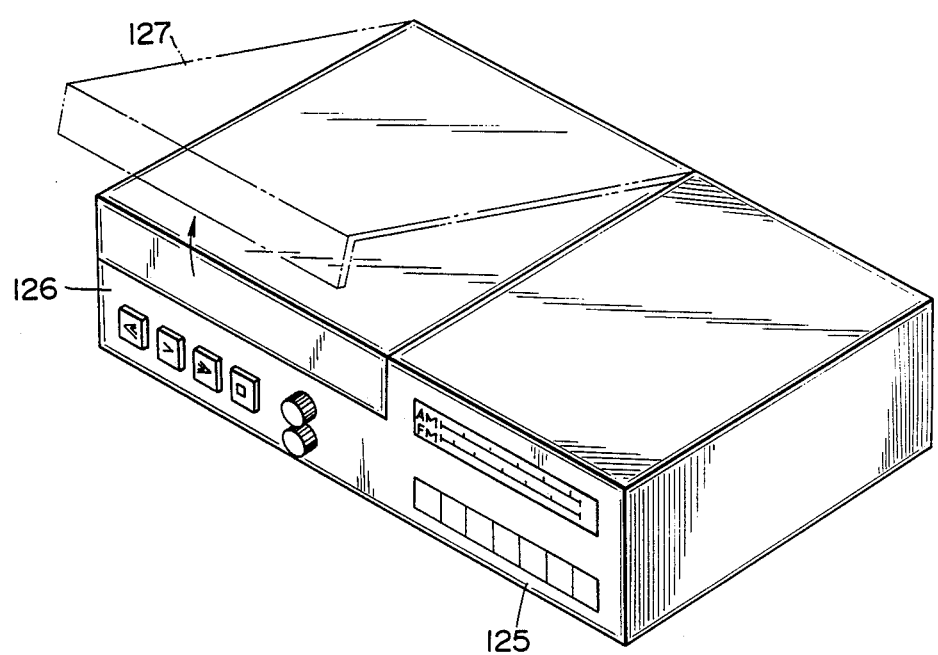
FIG. 15 is a perspective view showing still another embodiment of an optical disk player according to the present invention.

An optical disk player according to the present invention may be part of a stereophonic audio system which further includes an amplifier or a tuner 125 (FIG. 15). In this case, the overall system may be reduced in size because the casing 126 of the optical disk player is reduced in size.

Having described specific embodiments of the invention with reference to the accompanying drawings, it will be understood that the invention is not limited to those specific embodiments, and that many modifications and variations may be effected therein by one skilled in the art without departing from the spirit or scope of the invention, which is to be defined by the appended claims.

What is claimed is:

1. An optical disk player of the type adapted to play a compact disk having information recorded on its surface in substantially circular concentric tracks, comprising:

a substantially square base having dimensions in two orthogonally related directions substantially equivalent to the diameter of said disk and at least one portion projecting beyond the periphery of said disk in a radial direction intermediate said orthogonally related directions, said base having peripheral wall portions substantially coinciding with planes defining a square having a side equal to a diameter of said disk;

an optical pick-up means on said base including an object lens for scanning said tracks, a light source, a beam splitter, and a mirror, said light source, beam splitter and mirror being aligned in one portion of an optical path parallel to the surface of said disk, said object lens having an optical axis perpendicular to said portion of the optical path and said mirror being angularly positioned to reflect a beam of light emitted by said light source out of said portion of the optical path and into parallel relation to said optical axis;

said optical pick-up means further having position control means including tracking control means for moving said optical pick-up means in respect to said disk, said tracking control means including diffraction grating means for dividing said beam of light into a main beam and first and second auxiliary beams which form main and first and second auxiliary beam spots, respectively, which are spaced on said disk substantially along a tangential direction of said tracks with said first said second auxiliary beam spots being offset from said tangential direction by equal and opposite deviations, means for detecting said opposite deviations of said first and second auxiliary beam sport, and means for moving said object lens in response to said detected deviations to position said main beam spot at a selected one of said tracks; and drive means for moving said optical pick-up means along a straight path parallel to said radial direction between an outermost position for scanning an outermost track of said disk and in which said pick-up means is accommodated at least in part, within said one projecting portion and an inner position for scanning an innermost track of said disk;

said one portion of the optical path lying at an acute angle with respect to the radial direction of motion of said optical pick-up means and substantially parallel to one of said orthogonally related directions; and said diffraction grating being oriented at said acute angle with respect to a plane containing said one portion of the optical path and said optical axis of the object lens, whereby said main and said first and second auxiliary beams are provided in a plane oriented at said acute angle.

2. An optical disk player accoridng to claim 1, in which said means for detecting includes photodetecting means also oriented at said acute angle.

3. An optical disk player according to claim 1, wherein said position control means includes focus control means for moving said optical pick-up means perpendicularly to the surface of said disk.

4. An optical disc player according to claim 1, wherein said acute angle between said radial direction of motion of said optical pick-up means and said predetermined one of said orthogonally related directions is 45°.

5. An optical disk player of the type adapted to play a compact disk having information recorded on its surface in substantially circular concentric tracks, comprising:

a substantially square base having dimensions in two orthogonally related directions substantially equivalent to the diameter of said disk and at least one portion projecting beyond the periphery of said disk in a radial direction intermediate said orthogonally related direction;

a disk table driven by drive motor means for rotating said compact disk thereon;

guide means comprising first and second parallel guides provided beneath and parallel to the surface of said compact disk and in a direction parallel to said radial direction;

optical pick-up means including an object lens for scanning said tracks and mounted for guided movement along said guide means, said optical pick-up means having a first optical path normal to said compact disk in which said object lens is supported for movement in a first direction for focussing control and a second direction for tracking control, a focus drive means and a tracking drive means for driving said object lens in said first and second directions, respectvely, said optical pick-up means further having a second optical path lying in a plane parallel to the surface of said disk at an acute angle with respect to said guide means and substantially parallel to one of said orthogonal directions, and a third optical path lying in said plane parallel to the surface of said disk, a beam splitter provided at an intersection point of said second and third optical paths, a light source provided at an end of one of said second and third optical paths, detecting means provided at an end of the other of said second and third optical paths and diffraction grating means for dividing said beam of light into a main beam and first and second auxiliary beams producing main and first and second auxiliary beam spots, respectively, on said disk, a grating pattern of said diffraction grating means being inclined by said acute angle relative to said disk so that said first and second auxiliary beam spots are spaced on said disk substantially along a tangential direction of said tracks with said first and second auxiliary beam spots being offset from said tangential direction by equal and opposite deviations;

means for detecting said opposite deviations of said first and second auxiliary beam spots, thereby driving said tracking drive means for moving said object lens to position said main beam spot at a selected one of said tracks; and drive means for moving said optical pick-up means along said guide means between an outermost position for scanning an outermost track of said disk and in which said pick-up means is accommodated, at least in part, within said one projecting portion and an inner position for scanning an innermost track of said disk.

6. An optical pick-up means for use in an optical disk player which reproduces signals recorded in a plurality of substantially circular tracks on an optical disk comprising:

an object lens for scanning said tracks and mounted for guided movement along a guide means;

a first optical path normal to said disk in which said object lens is supported for movement in a first direction for focussing control and a second direction for tracking control;

focus drive means and tracking drive means which drive said object lens in said first and second directions, respectively;

a second optical path lying in a plane parallel to the surface of said disk at an acute angle with respect to said guide means, and a third optical path lying in said plane parallel to the surface of said disk;

a beam splitter provided at an intersection point of said second and third optical paths;

a light source provided at an end of one of said second and third optical paths;

detecting means provided at an end of the other of said second and third optical paths;

diffraction grating means for dividing said beam of light into a main beam and first and second auxiliary beam producing main and first and second auxiliary beam spots, respectively, on said disk, a grating pattern of said diffraction grating means being inclined by said acute angle relative to said disk so that said first and second auxiliary beam spots are spaced on said disk substantially along a tangential direction of said tracks with said first second auxiliary beam spots being offset from said tangential direction by equal and opposite deviations; and means for detecting said opposite deviations of said first and second auxiliary beam spots; thereby driving said tracking drive means for moving said object lens to position said main beam spot at a selected one of said tracks.

* * * * *